(12) United States Patent
Kuang et al.

(10) Patent No.: US 11,069,104 B1
(45) Date of Patent: Jul. 20, 2021

(54) DISPLAY THAT USES A LIGHT SENSOR TO GENERATE ENVIRONMENTALLY MATCHED ARTIFICIAL REALITY CONTENT

(71) Applicant: Facebook Technologies, LLC, Menlo Park, CA (US)

(72) Inventors: Jiangtao Kuang, San Jose, CA (US); Edward Buckley, Redmond, WA (US); Honghong Peng, Mountain View, CA (US); Sapna Shroff, Burlingame, CA (US); Romain Bachy, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/931,425

(22) Filed: May 13, 2020

(51) Int. Cl.
*G06T 11/60* (2006.01)
*G06T 11/00* (2006.01)
*G06T 7/90* (2017.01)
*G06T 19/00* (2011.01)
*G09G 5/00* (2006.01)

(52) U.S. Cl.
CPC ........... *G06T 11/60* (2013.01); *G06T 7/90* (2017.01); *G06T 11/001* (2013.01); *G06T 2207/10024* (2013.01); *G06T 2207/10048* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,871,825 B1* | 12/2020 | Sztuk | ....................... | G06F 3/013 |
| 10,877,622 B2* | 12/2020 | Romano | ............... | G06K 9/2036 |
| 10,916,023 B2* | 2/2021 | Hall | ........................ | G01B 11/25 |
| 2015/0187108 A1* | 7/2015 | Mullins | .................... | G06T 11/60 |
| | | | | 345/633 |
| 2015/0279113 A1* | 10/2015 | Knorr | ..................... | G06T 15/50 |
| | | | | 345/633 |
| 2015/0302658 A1* | 10/2015 | O'Connor | ................. | G06F 3/16 |
| | | | | 345/633 |

* cited by examiner

*Primary Examiner* — Wesner Sajous
(74) *Attorney, Agent, or Firm* — Fenwick & West LLP

(57) ABSTRACT

A display assembly generates environmentally matched virtual content for an electronic display. The display assembly includes a display controller and a display. The display controller is configured to estimate environmental matching information for a target area within a local area based in part on light information received from a light sensor. The target area is a region for placement of a virtual object. The light information describes light values. The display controller generates display instructions for the target area based in part on a human vision model, the estimated environmental matching information, and rendering information associated with the virtual object. The display is configured to present the virtual object as part of artificial reality content in accordance with the display instructions. The color and brightness of the virtual object is environmentally matched to the portion of the local area surrounding the target area.

20 Claims, 8 Drawing Sheets

DISPLAY THAT USES A LIGHT SENSOR TO GENERATE ENVIRONMENTALLY MATCHED ARTIFICIAL REALITY CONTENT

FIELD OF THE INVENTION

This disclosure relates generally to displays, and more specifically to a display (e.g., augmented reality and/or mixed reality) that uses an integrated light sensor to generate environmentally matched artificial reality content.

BACKGROUND

A display for an artificial reality system presents virtual content to a user. The virtual content may be viewed in environments with varying colors, brightnesses, and/or color temperatures. Some conventional artificial reality systems generate virtual content (e.g., one or more virtual objects) on see-through displays where the user perceives the virtual object(s) and surrounding real-world objects at the same time through the see-through display. However, if the virtual object has a different color and/or brightness appearance than the real-world objects, the virtual object may appear unnatural. This reduces the user experience and negatively affects the immersion of the user in the artificial reality environment.

SUMMARY

A display assembly is configured to customize artificial reality content (e.g., augmented reality, mixed reality, and/or virtual reality) for display based in part on estimated environmental matching information (e.g., white point, color, brightness, etc.) of a surrounding environment. The artificial reality content may comprise virtual content and real-world content presented on a display simultaneously. The surrounding environment of the display assembly is the real-world content. The display assembly uses a light sensor to generate environmentally matched virtual content included in the artificial reality content. A user of the display assembly is provided with a better visual experience.

The light sensor captures light information from a local area. In some embodiments, the light sensor is a component of the same device the display assembly is a part of In other embodiments, the light sensor is part of a separate component. The light information at least describes light values for a plurality of different color channels.

In some embodiments, the display assembly includes a display controller and a display. The display controller is configured to estimate environmental matching information for a target area within a local area based in part on light information received from the light sensor. The target area is a region for placement of a virtual object. The display controller generates display instructions for the target area based in part on a human vision model, the estimated environmental matching information, and rendering information associated with the virtual object. The display is configured to present the virtual object as part of artificial reality content in accordance with the display instructions. The artificial reality content includes the virtual object in the target area and the portion of the local area surrounding the target area. The color and brightness of the virtual object environmentally matches the portion of the local area surrounding the target area.

In some embodiments, a method is disclosed for customizing artificial reality content for display based in part on estimated environmental matching information for a target area within a local area. The method includes receiving light information from a light sensor. The light information describing at least light values for a plurality of different color channels. The method also includes estimating environmental matching information for the target area within the local area based in part on the received light information. The target area is a region for placement of the virtual object. The method also includes generating display instructions for the target area based in part on a human vision model, the estimated environmental matching information, and rendering information associated with the virtual object. The method also includes presenting the virtual object as part of artificial reality content in accordance with the display instructions. The artificial reality content includes the virtual object in the target area and a portion of the local area surrounding the target area. The color and brightness of the virtual object environmentally matches the portion of the local area surrounding the target area. Also disclosed are embodiments of non-transitory computer-readable storage mediums configured to store instructions for performing the methods of this disclosure.

Figure 1A:
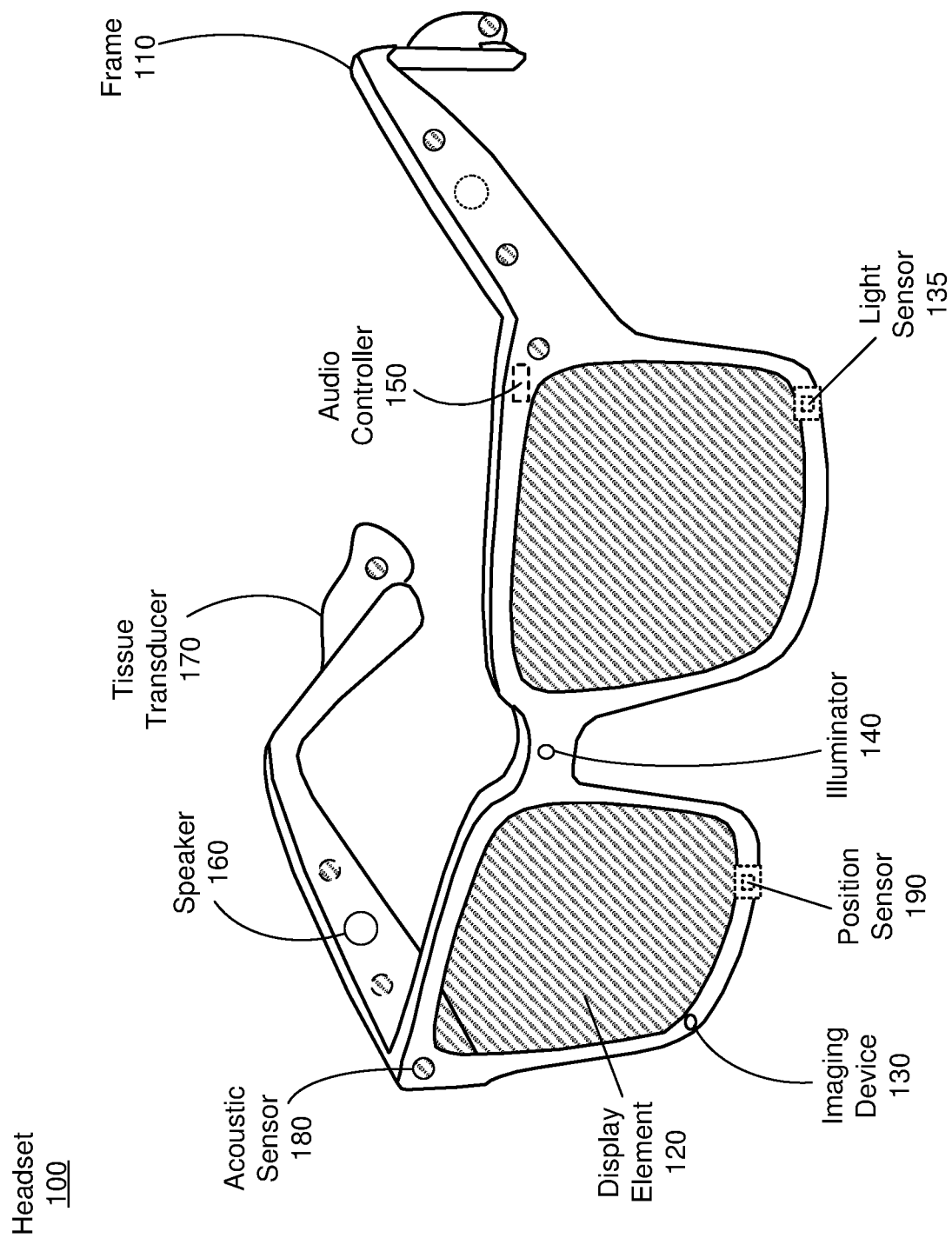
FIG. 1A is a perspective view of a headset implemented as an eyewear device, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

A display assembly that uses light information from a light sensor to environmentally match artificial content. The display assembly estimates environmental matching information for a target area within a local area to generate display instructions for the target area. The display instructions are used by the display assembly for the presentation of artificial reality content to a user. Artificial reality content may include both virtual content and real-world content. The target area is a region within the local area for placement of virtual content. The region includes a set of locations within the local area. The virtual content may include one or more virtual objects placed at one or more target areas. In one embodiment, the display assembly includes a display element and a display controller. The display element presents the artificial reality content in accordance with the display instructions determined by the display controller. The display instructions include instructions about the color and brightness of the virtual object, such that the presented virtual object environmentally matches a portion of the local area surrounding the target area.

The display element provides light to a user of the display assembly. In one embodiment, the display element presents image light (e.g., a virtual object) and transmits light from the surrounding local area to the user. In this embodiment, the display element may be a see-through display (e.g., a see-through display of a headset device). In another embodiment, the display element presents only image light to the user. In this embodiment, the display element may be a display screen (i.e., not a see-through display). For example, the display element may be a display screen of a mobile device (e.g., a smartphone). In this example, the smartphone may capture images of the local area and augment the captured images with an environmentally matched virtual object. The display element generates image light according to virtual content rendered to be presented to the user. The virtual content may be adjusted by the display assembly prior to presentation of the content on the display element based on display instructions received from the display controller.

A light sensor determines light information for the local area. In one embodiment, the light information is measured by a light sensor integrated on the same electronic device as the display assembly. In another embodiment, the light sensor is incorporated on a separate electronic device in communication with the display assembly. In some embodiments, light information is received from an imaging device (e.g., a camera of a depth camera assembly, a camera of an eye tracking system, etc.). In another embodiment, the light information is received from a combination of the light sensor and the imaging device. The light information at least describes light values for a plurality of different color channels (e.g., RGB and/or IR). The light values may include chromaticity measurements, luminance measurements, color temperature values, some other light value that quantifies the color and/or brightness of the local area, or some combination thereof. In some embodiments, the light values may further include a hue value, a saturation value, and/or a white point value for the local area.

The display controller estimates environmental matching information for the target area within the local area based in part on light information determined by the light sensor. The estimated environmental matching information describes the color, brightness, lighting effects, and/or shadowing of the target area within the local area. The estimated environmental matching information includes an estimated color temperature and an estimated brightness of the target area. Color temperature describes an energy distribution of light emitted from a black body radiator as a function of temperature. An average daylight spectrum is typically around 5500K, and temperatures above this are bluer, and temperatures below this are redder. The estimated color temperature sets a white point as a function of location within the local area. The brightness describes the amount of light at the target area (i.e., the amount of light passing through, emitted from, or reflected from the target area). In one embodiment, the brightness may comprise a luminance measurement. In some embodiments, the estimated environmental matching information may include other information for the target area such as hue, saturation, or some other color information that describes the color and/or brightness of the target area.

In some embodiments, the display controller calibrates a human vision model for each user of the display assembly. The human vision model is standardized measurements of color that describe how to numerically specify and/or display a measured color for a human (e.g., the user). Calibrating the human vision model for each user avoids any metamerism errors that may occur during the presentation of virtual content. Metamerism is a perceived matching of colors with different color and brightness values.

The display controller generates display instructions for the display element. The display instructions provide information to the display element related to environmentally matching adjustments needed to display one or more virtual objects in a manner such that a virtual object environmentally matches the portion of the local area surrounding the target area. The presented virtual object may blend with the color and brightness of the portion of the local area. In one embodiment, the display instructions may include one or more pixel value adjustments for the target area. The pixel value adjustments adjust color and/or brightness of the virtual object.

The display instructions generated by the display controller are based in part on the human vision model, the estimated environmental matching information, and rendering information associated with the virtual object. The rendering information associated with the virtual object is a predetermined color and predetermined brightness for a particular virtual object. The display instructions are provided to the display element for presentation of the virtual object as artificial reality content.

The display controller may update the display instructions dynamically. In one embodiment, the display controller may compare the current display instructions with the estimated environmental matching information. For example, the display controller may compare a color value included in the current display instructions with a color value included in the estimated environmental matching information. If the two color values differ by a threshold amount or the two color values have changed (i.e., increased or decreased) by a threshold amount, the display controller updates the display instructions to match the estimated environmental matching information.

Note that there are conventional methods of customizing a display to account for the color and/or brightness of the local environment of the user. However, conventional methods account for adjusting the color and/or brightness on display screens for the presentation of video only. For example, a display screen of a smartphone may automatically adjust the screen's brightness based on ambient lighting. The entire video feed displayed on the screen would be adjusted. For the presentation of artificial reality content, to be believable, a display assembly that uses a light sensor to generate environmentally matched artificial reality content is needed. The display assembly customizes the generated artificial reality content (e.g., augmented reality content and/or mixed reality content) to environmentally match the ambient lighting and ambient color. In a headset device, the display may be adjusted based on changes caused by the headset. For example, a brightness level of a virtual object takes into an account color attenuation that could occur in the real-world light as it is transmitted through the device. The display assembly may also account for any metamerism errors by calibrating the display assembly for each user. For example, in a head mounted display, color display settings may be personalized (i.e., calibrated) for each user of the head-mounted display. The personalized color display settings may be stored in a user's profile. During presentation of a virtual object of a particular color, the personalized color display settings are taken into account and the presented color is adjusted accordingly. By customizing generated artificial reality content to environmentally match the ambient lighting and ambient color, the display assembly provides realistic-looking generated content for the user. For example, the display assembly may detect the background or context of the generated content and adjust the display settings for a more natural appearance of the generated content.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

Example Headsets

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), a light sensor 135, an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. In one embodiment, the light provided to the user by the one or more display elements 120 may be in the form of image light. The image light may be, e.g., one or more virtual objects presented as virtual content to the user. In another embodiment, the light provided to the user by the one or more display elements 120 may be image light and light from the surrounding local area. In this embodiment, one or both of the display elements 120 may transmit light from a local area around the headset 100. For example, the local area may be a room that a user wearing the headset 100 is inside of, or the user wearing the headset 100 may be outside and the local area is an outside area. In this context, light from the local area may be combined with light from the one or more display elements to produce artificial reality content. The display elements 120 present artificial reality content to the user according to display instructions received from the display controller.

As illustrated the headset includes a display element 120 for each eye of a user. In some embodiments, a display element 120 generates image light that is provided to an eyebox of the headset 100. The eyebox is a location in space that an eye of the user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides.

Note that in some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of the local area surrounding the headset 100. The DCA includes one or more imaging devices 130 and a DCA controller (not shown in FIG. 1A) and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. An imaging device 130 is a camera configured to capture images of the local area. An imaging device may capture images in an IR band of light (e.g., the band of the structured light, IR Flash, etc.), a visible band of light, or some combination thereof. In some embodiments, the one or more imaging devices 130 capture images of the portion of the local area that include the light from the illuminator 140. In some embodiments, the captured images of the portion of the local area include light information about the local area. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The light sensor 135 determines light information about the local area. The light information may include light values for a plurality of different color channels. In one embodiment, the light values include chromaticity measurements, luminance measurements, color temperature values, some other light value that quantifies the color and/or brightness of the local area, or some combination thereof. The color channels may include channels for visible light and/or channels for infrared light. Examples of visible light color channels include RGB-type color channels (e.g., sRGB, Adobe RGB, Adobe Wide Gamut RGB, etc.), CIE defined standard color channels (e.g., CIE 1931 XYZ, CIELUV, CIELAB, CIEUVW, etc.), Luma plus chroma/chrominance-based color spaces (e.g., YIQ, YUV, YDbDr, YPbPr, YCbCr, xvYCC, LAB, etc.), hue and saturation-based color spaces (e.g., HSV, HSL), CMYK-type color channels, and any other suitable color channel.

Examples of the light sensor 135 may include an ambient light sensor, a color sensor, a photodetector (e.g., a photodiode, a phototransistor, a photoresistor, etc.), another type of photoelectric device, an active infrared sensor, a passive infrared sensor, a camera (e.g., imaging device 130, a camera on a mobile device, etc.) another suitable type of sensor that detects light, or some combination thereof. In one embodiment, the light sensor 135 includes a photodetector that detects light in the local area and converts light into a voltage signal or a current signal. The photodetector may be coupled with an analog-to-digital converter (ADC) to convert voltage signals or current signals into digital signals for further processing. The ADC may be included in a display controller. In some embodiments, the light sensor 135 may include a photodetector combined with different color filters (e.g., RGB color filters and IR filters) to detect light values. In other embodiments, the light sensor 135 may include a plurality of light sensors (e.g., a photodiode and a camera). The light sensor 135 or light sensors may be located on a portion of the frame 110 of the headset 100.

The display controller (not shown in FIG. 1A) controls the one or more display elements 120. The display controller estimates environmental matching information for a target area within the local area based in part on received light information (e.g., received from the light sensor). The local area is a physical area surrounding the headset 100. The target area within the local area is a region where virtual content (e.g., a virtual object) is presented so that it appears in this region within the local area. The display controller generates display instructions for the target area based in part on a human vision model (e.g., a standard observer model, a calibrated standard observer model, etc.), the estimated environmental matching information, and the rendering information associated with a virtual object. The rendering information associated with the virtual object is a predetermined color and predetermined brightness for a particular virtual object. The predetermined color and predetermined brightness may not be environmentally matched with the local area. In one embodiment, the rendering information associated with the virtual object is provided by a separate device (e.g., a console, a mobile device, etc.). The display controller provides the display instructions to the display elements 120 for presentation of artificial reality content to the user. In one embodiment, the display instructions provided to the display elements 120 are associated with the presentation of augmented realty and/or mixed reality content.

The audio system provides audio content. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller 150 processes information from the sensor array that describes sounds detected by the sensor array. The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine light information of the local area, generate a model of the local area, update a model of the local area, or some combination thereof. Furthermore, the position sensor 190 tracks the position (e.g., location and pose) of the headset 100 within the room. Additional details regarding the components of the headset 100 are discussed below in connection with FIG. 6.

Figure 1B:
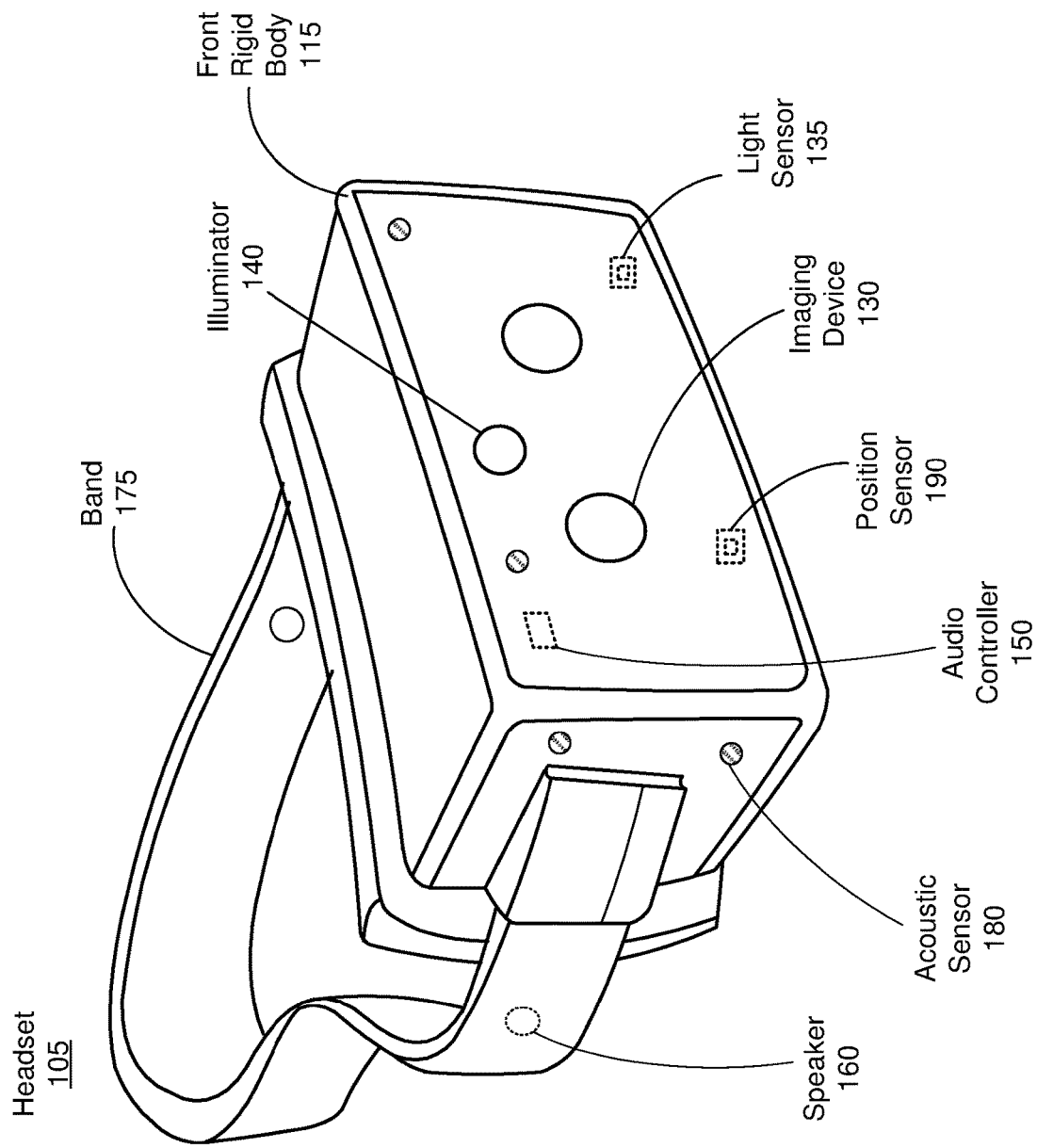
FIG. 1B is a perspective view of a headset implemented as a head-mounted display, in accordance with one or more embodiments.

FIG. 1B is a perspective view of a headset 105 implemented as an HMD, in accordance with one or more embodiments. In embodiments that describe an AR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly, a DCA, a light sensor 135, an audio system, and a position sensor 190. FIG. 1B shows the illuminator 140, a plurality of the speakers 160, a plurality of the imaging devices 130, a plurality of acoustic sensors 180, and the position sensor 190.

Display Assembly

Figure 2:
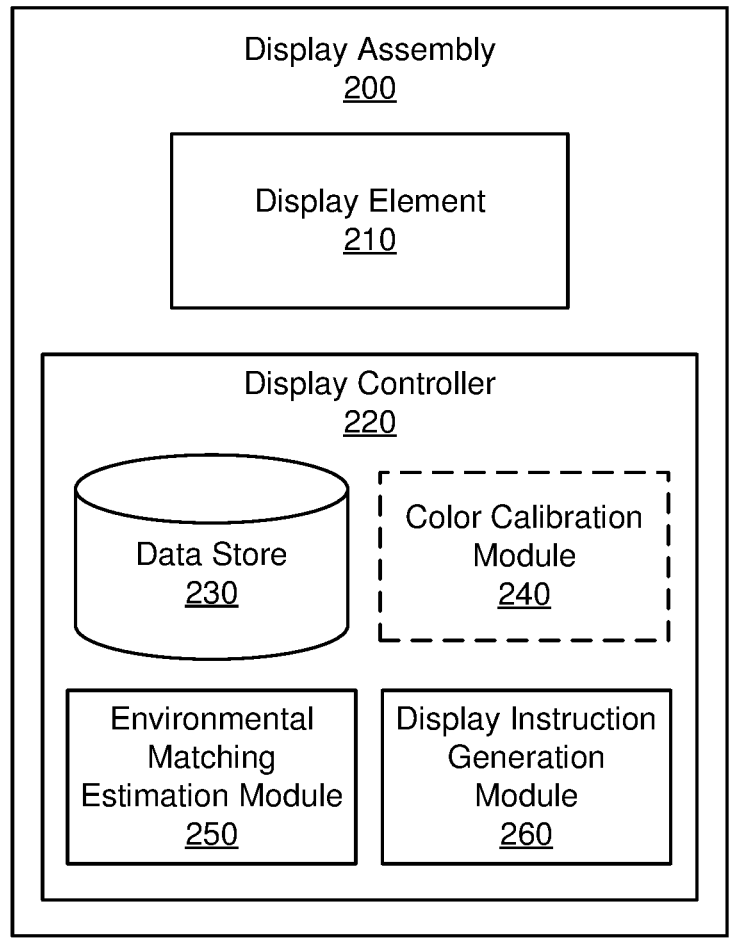
FIG. 2 is a block diagram of a display assembly, in accordance with one or more embodiments.

FIG. 2 is a block diagram of a display assembly 200, in accordance with one or more embodiments. The display assembly 200 estimates environmental matching information for a target area within a local area to generate display instructions for the target area. The display assembly 200 may then use the display instructions to present artificial reality content to a user. The artificial reality content may include virtual content and real-world content. The display assembly 200 may be a component of an electronic device. The electronic device includes a display and an imaging device (e.g., a camera) and/or a light sensor (e.g., the light sensor 135). For example, the electronic device may be a headset (e.g., the headset 100 or the headset 105), a smartphone, a tablet device, or some other mobile device. In the embodiment of FIG. 2, the display assembly 200 includes a display element 210 and a display controller 220. Some embodiments of the display assembly 200 have different components than those described here. For example, the display assembly 200 may include one or more light sensors. Similarly, in some cases, functions can be distributed among the components in a different manner than is described here.

The display element 210 is configured to provide light to a user of the electronic device. In some embodiments, the display element 210 may be the display element 120 and/or substantially similar to the display element 120. The display element 210 may present image light (e.g., virtual content) to the user and/or transmit light from the surrounding local area to the user. In one embodiment, the display element 210 may be a see-through display and present image light and transmit light from the surrounding local area to the user. In another embodiment, the display element 210 may be a display screen (i.e., not a see-through display) and present only image light to the user.

The display element 210 generates image light according to virtual content rendered to be presented to the user. The virtual content may include one or more virtual objects. The virtual content to be presented to the user may be provided by a separate device (e.g., a console, a database, etc.) connected to the display assembly 200 via a network. In one embodiment, the region where the virtual content will be displayed is provided by a separate device. The virtual content may be adjusted by the display assembly 200 prior to presentation of the content on the display element 210. Additional details regarding an example presentation of artificial reality content to the user is discussed below in connection with FIG. 3.

The display element 210 presents two-dimensional (2D) or three-dimensional (3D) images to the user. In various embodiments, the display element comprises a single electronic display or multiple electronic displays (e.g., a display for each eye of the user). Examples of display elements include: a liquid crystal display (LCD), an organic light emitting diode (OLED) display, a micro light emitting diode (microLED) display, an active-matrix organic light-emitting diode display (AMOLED), a waveguide display, some other display, or some combination thereof.

The display controller 220 controls operation of the display assembly 200. In the embodiment of FIG. 2, the display controller 220 includes a data store 230, an environmental matching estimation module 250, and a display instruction generation module 260. In some embodiments, the display controller 220 may also include a color calibration module 240. Some embodiments of the display controller 220 have different components than those described here. Similarly, functions can be distributed among the components in different manners than described here. For example, some functions of the controller may be performed external to the electronic device.

The data store 230 stores data for use by the display assembly 200. Data in the data store 230 may include light information captured by a light sensor, light information captured by an imaging device, estimated environmental information, one or more human vision models, virtual content (i.e., one or more virtual objects), rendering information associated with the virtual objects, display instructions, and other data relevant for use by the display assembly 200, or any combination thereof.

The color calibration module 240 is configured to calibrate a human vision model for each user of the display assembly 200. The human vision model is standardized measurements of color for a human. The standardized measurements describe how to numerically specify and/or display a measured color for a human (e.g., the user). Example human vision models include CIE 1931, CIE 1964, CIE-CAM02, CIELAB, Munsell color system, etc. The human vision model used by the display assembly 200 is stored in the data store 230. The color calibration module 240 calibrates the human vision model for one or more users of the electronic device. The color calibration module 240 performs a color calibration process to determine color perception specific to each user of the display assembly 200 based in part on information received from the user (e.g., via one or more input devices). For instance, the color calibration module 240 may perform a start-up color calibration process. The start-up color calibration process may take place each time a new user of the electronic device is identified at start-up. The start-up color calibration process may take place in different lighting environments (e.g., natural lighting, fluorescent lighting, etc.). In one example, one or more color cards (i.e., a printed sheet with one or more colors printed on the surface) is placed in the local area of the user. Each color on the one or more color cards has a known color profile (i.e., a standardized measurement). The display element 210 presents artificial reality content to the user that includes a set of colors as virtual objects at target locations within the local area. The set of colors presented as virtual objects are based on known color profiles. The user may be asked via audio cues and/or visual cues to select one or more virtual objects from the virtual content that match to the one or more color cards and/or that closely match to the one or more color cards. This process may be repeated several times and may use color cards that cover the display color gamut. Based on the selections made by the user, the color calibration module 240 adjusts the measurement values of the human vision model. For instance, a color card with an orange color block and a red color block is placed in the local area of the user and the display element presents a virtual object that is orange and a virtual object that is red. The user is asked to select the virtual object that is red. The user may select the virtual object that is orange. The color calibration module 240 may then adjust the human vision model for this user by shifting the standardized color measurement values.

The environmental matching estimation module 250 receives light information for the local area. In one embodiment, the light information is measured by a light sensor integrated on the same electronic device as the display assembly 200. In another embodiment, the light sensor is incorporated on a separate electronic device (e.g., a mobile device, a separate component of a headset, etc.) in communication with the display assembly 200. In some embodiments, the light information is received from an imaging device (e.g., a camera of a depth camera assembly, a camera of an eye tracking system, etc.). In another embodiment, the light information is received from a combination of the light sensor and the imaging device. The light information is provided to the display assembly 200 and stored in the data store 230.

The light information at least describes light values for a plurality of different color channels (e.g., RGB and/or IR). The light values may include chromaticity measurements, luminance measurements, color temperature values, some other light value that quantifies the color and/or brightness of the local area, or some combination thereof. The chromaticity measurements describe the quality of a color in the local area. The luminance measurements describe the luminous intensity per unit area of light in the local area. The color temperature is the temperature at which a black body would emit radiation of the same color as the portion of the local area. In some embodiments, the light values may further include a hue value, a saturation value, and/or a white point value for the local area. The hue value describes a gradation of color of the local area. The saturation value describes the intensity of color of the local area. The white point describes the color "white" in the local area. In one example, the white point may comprise a set of tristimulus values and/or a set of chromaticity values.

The environmental matching estimation module 250 estimates environmental matching information for the local area based on the received light information. For example, the environmental matching estimation module 250 may estimate environmental matching information for one or more regions within the local area. Each region includes a plurality of locations. The estimated environmental matching information describes the color, brightness, lighting effects, and shadowing of the one or more regions within the local area. In one embodiment, the environmental matching estimation module 250 estimates the environmental matching information by determining absolute light values (e.g., a luminance value and a chromaticity value) for the one or more regions within the local area. The environmental matching information may be collected in an environmental matching model. The environmental matching model maps environmental matching information to different pixels that map to respective locations as a function of position of the electronic device. The position of the electronic device takes into consideration the orientation of the user. For example, as the user changes their position within the local area, the color and/or brightness of the target area may change. For instance, as the user walks around the local area, the user may block light from a lamp and cast a shadow onto the target area. The environmental matching estimation module 250 may estimate new environmental matching information for the target area based on the position and/or orientation update of the user. Each pixel includes a value that describe the color and/or brightness of that particular pixel. Each pixel comprises an angular range of the content feed presented by the display element 210. In one embodiment, the environmental matching estimation module 250 determines environmental matching information for a target area within the local area based on the environmental matching model. The target area being a region or set of locations where a virtual object may be displayed. In some embodiments, the environmental matching estimation module 250 determines environmental matching information for a portion of the local area based on the environmental matching model. The portion of the local area is a region surrounding the target area (i.e., a set of locations around the periphery of the target area).

In one embodiment, the estimated environmental matching information of the environmental matching model at least includes an estimated color temperature (may be used to set the white point) of the target area as a function of location within the target area. In some embodiments, the environmental matching model includes estimated color temperatures for the portion of the local area surrounding the target area. The color temperatures for each location within the target area and/or within the portion of the local area may be determined by extracting color temperature values from captured images. For instance, multiple images of the target area and/or portion of the local area are captured from multiple vantage points. The color temperature values may be dynamically updated as new color temperature values are extracted from the captured images. In another embodiment, the color temperature may be determined by chromaticity measurements measured by the light sensor. The environmental matching estimation module 250 may convert chromaticity measurements (e.g., tristimulus values) to color temperatures.

In another embodiment, the estimated environmental matching information of the environmental matching model includes an estimated brightness of the target area. In some embodiments, the environmental matching model includes estimated brightness for the portion of the local area surrounding the target area. The brightness describes the amount of light at each location within the target area and/or the amount of light at each location within the portion of the local area (i.e., the amount of light passing through, emitted from, or reflected from each location) and may comprise a luminance measurement. The brightness for each location may be determined by extracting pixel values from captured images. For instance, multiple images are captured of the target area and/or portion of the local area from multiple vantage points. The pixel values may be dynamically changing and being updated with each new captured image. The pixel values may be converted to light values by the environmental matching estimation module 250. In some embodiments, the estimated environmental matching information may include other color and/or brightness information for the target area such as hue, saturation, or some other color information that describes the color and/or brightness of the target area.

The display instruction generation module 260 is configured to generate display instructions for the display element 210. The display instructions provide information to the display element 210 related to color adjustments and/or brightness adjustments for displaying one or more virtual objects in a manner such that a virtual object environmentally matches a portion of the local area (i.e., the virtual object blends with the portion of the local area). In one embodiment, the display instructions may include one or more pixel value adjustments for each location within the target area. For instance, the pixel RGB values for the pixels that map to each location within the target area may be adjusted to environmentally match the estimated environmental matching information of the target area and the portion of the local area. In one embodiment, the adjustments may take place pixel by pixel with each pixel being adjusted. In another embodiment, the adjustments may take place with groupings of pixels with each grouping being adjusted. In some embodiments, the display instructions may also adjust pixel RGB values to environmentally match the estimated environmental matching information related to lighting effects and/or shadowing of the virtual object.

The display instructions generated by the display instruction generation module 260 are based in part on the human vision model, the estimated environmental matching information, and rendering information associated with the virtual object. In one embodiment, the rendering information associated with the virtual object is provided by a separate device (e.g., a console, a database, a server, etc.). The rendering information may be provided to the electronic device as a set of raw instructions. The rendering information associated with the virtual object may include a predetermined color and predetermined brightness for a particular virtual object to be displayed. The display instruction generation module 260 generates display instructions for rendering the virtual object according to the human vision model, the estimated environmental matching information, and the rendering information associated with the virtual object. The display instructions may augment the human vision model and the rendering information associated with the virtual object by the estimated environmental matching information. For example, the rendering information associated with the virtual object may include instructions to display a yellow ball (i.e., the virtual object). The human vision model may include a standardized color value for yellow that is used for the ball. The estimated environmental matching information may include color and brightness information that may augment the yellow ball (i.e., may augment the pixel values used for displaying the yellow ball at the target area) such that the yellow ball environmentally matches the target area. The yellow ball environmentally matches the target area based on a function of location. The yellow ball blends with the portion of the local area. The display instructions are provided to the display element 210 for presentation of the virtual object as artificial reality content.

The display instruction generation module 260 may update the display instructions dynamically. For example, the display instruction generation module 260 may compare a color value (e.g., a white point value) included in the current display instructions with a color value included in the estimated environmental matching information. In response to a difference between the two color values being greater than a predefined threshold value, the display instruction generation module 260 may determine to update the display instructions to match the color value from the estimated environmental matching information to render the virtual object for presentation. In one embodiment, a chromatic adaptation transform (e.g., a von Kries transform or a Bradford transform) may be used to match the color value (the white point value) from the estimated environmental matching information to render the virtual object.

In some embodiments, the display instruction generation module 260 updates the display instruction responsive to updating the target area for placement of a virtual object. For example, the user of the display assembly 200 may travel to a different room within a building. The local area has changed and the target area for placement of the virtual object has updated. The environmental matching estimation module 250 generates updated environmentally matching information for the local area. The display instruction generation module 260 updates the display instructions accordingly.

Augmented Reality Content Presentation Example

Figure 3:
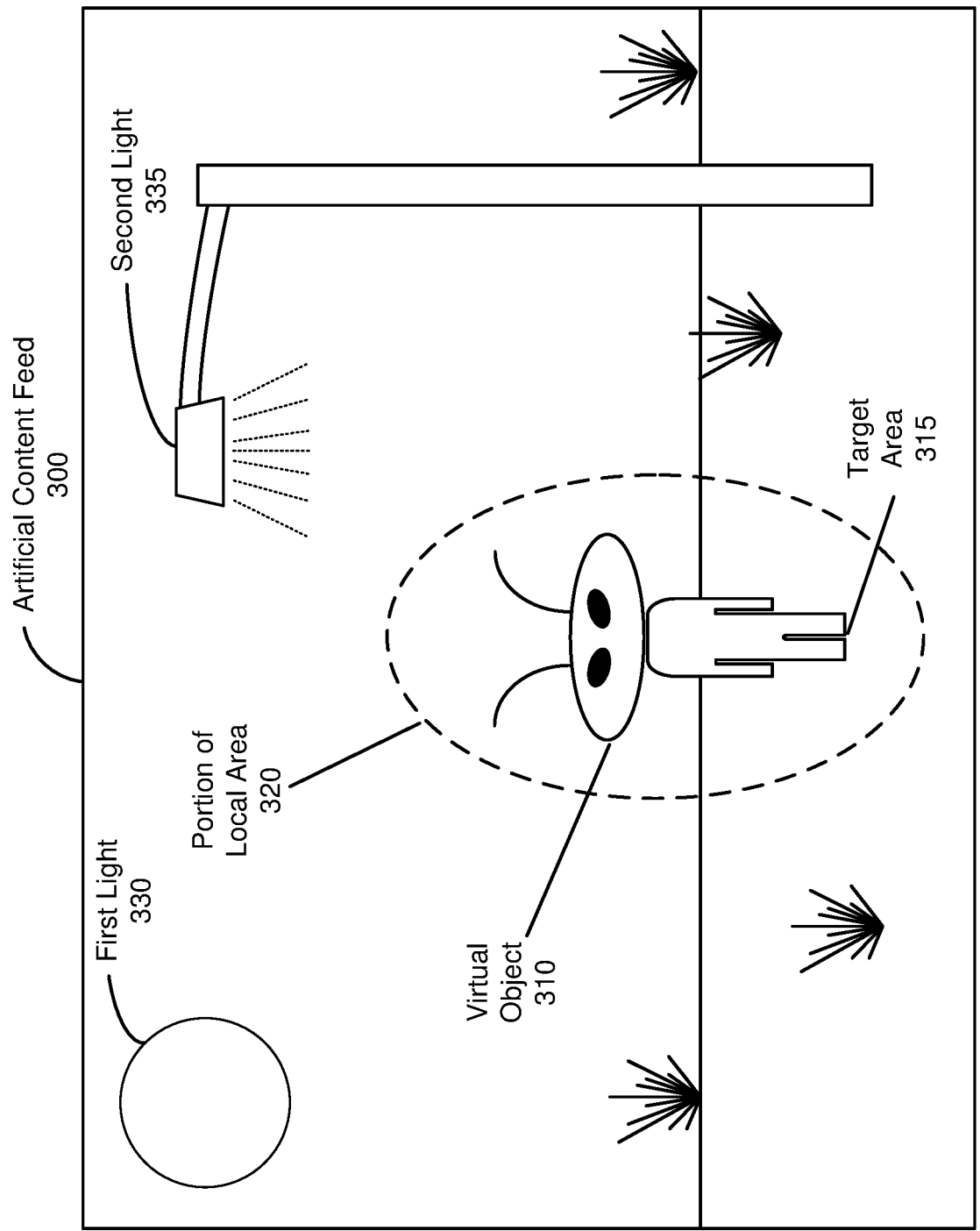
FIG. 3 illustrates an example artificial content feed from an artificial reality system that includes the display device, in accordance with one or more embodiments.

FIG. 3 illustrates an example artificial content feed 300 from an artificial reality system that includes the display assembly 200, in accordance with one or more embodiments. In the illustrated example, the artificial content feed 300 represents an outdoor setting. In other embodiments, the artificial content feed 300 may be any type of setting, including an indoor setting. The artificial content feed 300 is being displayed by a display element of an electronic device (e.g., a headset device, a mobile device, etc.).

A light sensor of the electronic device determines light information for the local area. The light information includes light values for the local area that describe the color and brightness of the local area. In FIG. 3, the light values comprise values that measure color and brightness of the local area based on light emitted from a first light source 330 and light emitted from a second light source 335. The first light source 330 describes light from the moon. The second light source 335 describes light from an artificial light source—e.g., a low pressure sodium light. Accordingly, the first light source 330 would have a color temperature of 5500K, and the second light source 335 would have a color temperature of ~1800K. The light information (i.e., the measured color and brightness values) for locations throughout the local area may be affected by each light source differently. For instance, locations illuminated by the second light source 335 may appear much warmer (orange cast) than locations illuminated with light from the first light source 330. And locations illuminated by both the first light source 330 and the second light source 335 have a color temperature that ranges between the color temperature of the first light source 330 and the second light source 335 based in part on their proximity to each of the light sources and the relative brightness of each source. Accordingly, the color temperature of the artificial content feed 300 changes as a function of location within the artificial content feed 300. The light information about the local area is provided to a display controller of the electronic device.

The display controller estimates environmental matching information (e.g., color temperature and brightness) for multiple regions (i.e., sets of locations) throughout the artificial content feed 300 based on the received light information. The estimated environmental matching information for locations throughout the artificial content feed 300 may be collected in an environmental matching model (i.e., a map of environmental matching information based on location). A target area 315 is a set of locations in the artificial content feed 300. The display controller may estimate environmental matching information for each location within the target area 315. In one embodiment, the display controller may determine where the target area 315 is to be located within the artificial content feed 300 based on information provided by a separate device (e.g., a mobile device). The display controller determines the environmental matching information for each location with the target area 315 based on the environment matching model. A portion of the local area 320 is a different set of locations in the artificial content feed 300. The display controller may estimate environmental information for each location within the portion of the local area 320. The portion of the local area 320 is a set of locations surrounding the periphery of the target area 315. The portion of the local area 320 includes the virtual object 310 and real-world objects (e.g., the grass, the sky, etc.). The display controller determines the environmental matching information for the portion of the local area 320 based on the environmental matching model.

The display controller updates display instructions for the artificial content feed 300 based at least in part on the determined environmental matching information about the target area 315 and the portion of the local area 320. The display instructions comprise instructions for presenting the virtual object 310 at the target area 315.

Note that if the virtual object 310 were to change position (e.g., change to a new set of locations) within the artificial content feed 300, the determined environmental matching information updates according to the new position. In an embodiment, where the virtual object 310 is positioned under the first light source 330, the virtual object 310 is environmentally matched with a portion of the local area (not shown) under the first light source 330. The virtual object 310 is less affected by the second light source 335. The environmental matching information for the updated position (i.e., for the new location of placement of the virtual object) is determined based on the environmental matching model. The determined environmental matching information is compared with current display instructions and updated accordingly. In this example, the display instruction for the virtual object 310 would include a white point value shifted to "bluer" chromaticity values, a lower brightness value, and less contrast between areas in light and shadow. In another embodiment, the virtual object 310 is positioned under the second light source 335. The virtual object 310 is environmentally matched with a portion of the local area (not shown) under the second light source 335. The virtual object 310 is less affected by the first light source 330. The environmental matching information for the updated position (i.e., for the new location of placement of the virtual object) is determined. The environmental matching information is compared with current display instructions and updated accordingly. In this example, the display instructions for the virtual object 310 would include a white point value shifted to "redder" chromaticity values, a higher brightness value, and more contrast between areas in light and shadow.

Example Light Sensors

Figure 4A:
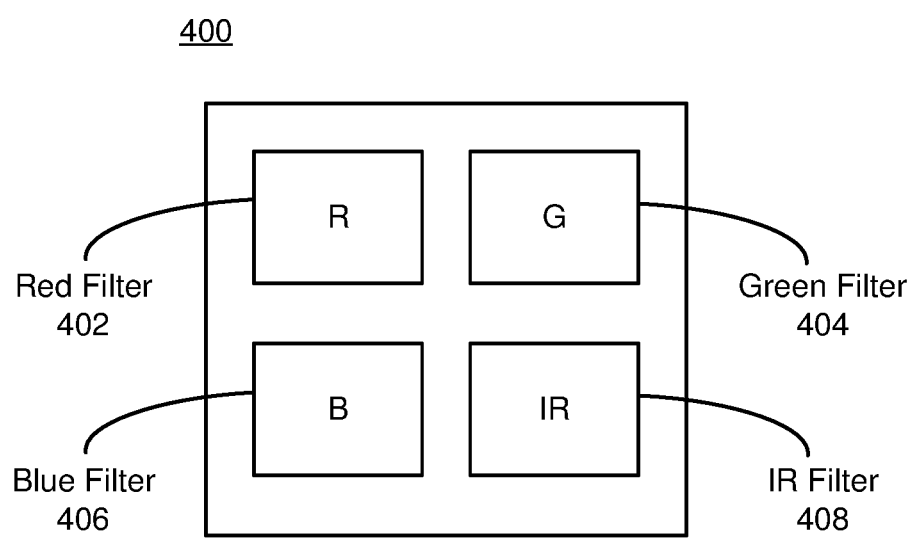
FIG. 4A illustrates an example light sensor, in accordance with one or more embodiments.

FIG. 4A illustrates an example light sensor 400, in accordance with one or more embodiments. The example light sensor 400 includes a photodiode array. The light sensor 400 converts light into an electrical current signal. The light sensor 400 may be included on an electronic device with a display assembly (e.g., the display assembly 200). The light sensor 400 detects light in particular color channels (e.g., RGB, IR, and/or whole visible spectrum) in a local area surrounding the electronic device. The light sensor 400 may comprise four color filters for detecting specific light values for the local area. The four color filters include a red filter 402, a green filter 404, a blue filter 406, and an infrared (IR) filter 408. The red filter 402, the green filter 404, and the blue filter 406 may measure light values related to hue, saturation, or some other light value for measuring the color and/or brightness of the local area. The IR filter 408 may measure an infrared signal which determines a light source type found in the local area. For example, outdoor lighting (e.g., sunlight) or indoor lighting (e.g., incandescent lights) may cause a high infrared signal value and indoor lighting (e.g., fluorescent lights or LED) may cause a low infrared signal value. In some embodiments, the infrared filter 408 may detect and may remove the infrared signal values from the light values measured by the red filter 402, the green filter 404, and the blue filter 406. The light sensor 400 provides the light information as an electrical current signal to a display controller of the electronic device. In one embodiment, the display controller uses an ADC to convert the current signal to a digital signal. The digital signal may be user to estimate environmental matching information about the local area. The light sensor 400 is simple, has a high sensitivity and low-processing times compared to an imaging device (e.g., a camera) as a light sensor.

Figure 4B:
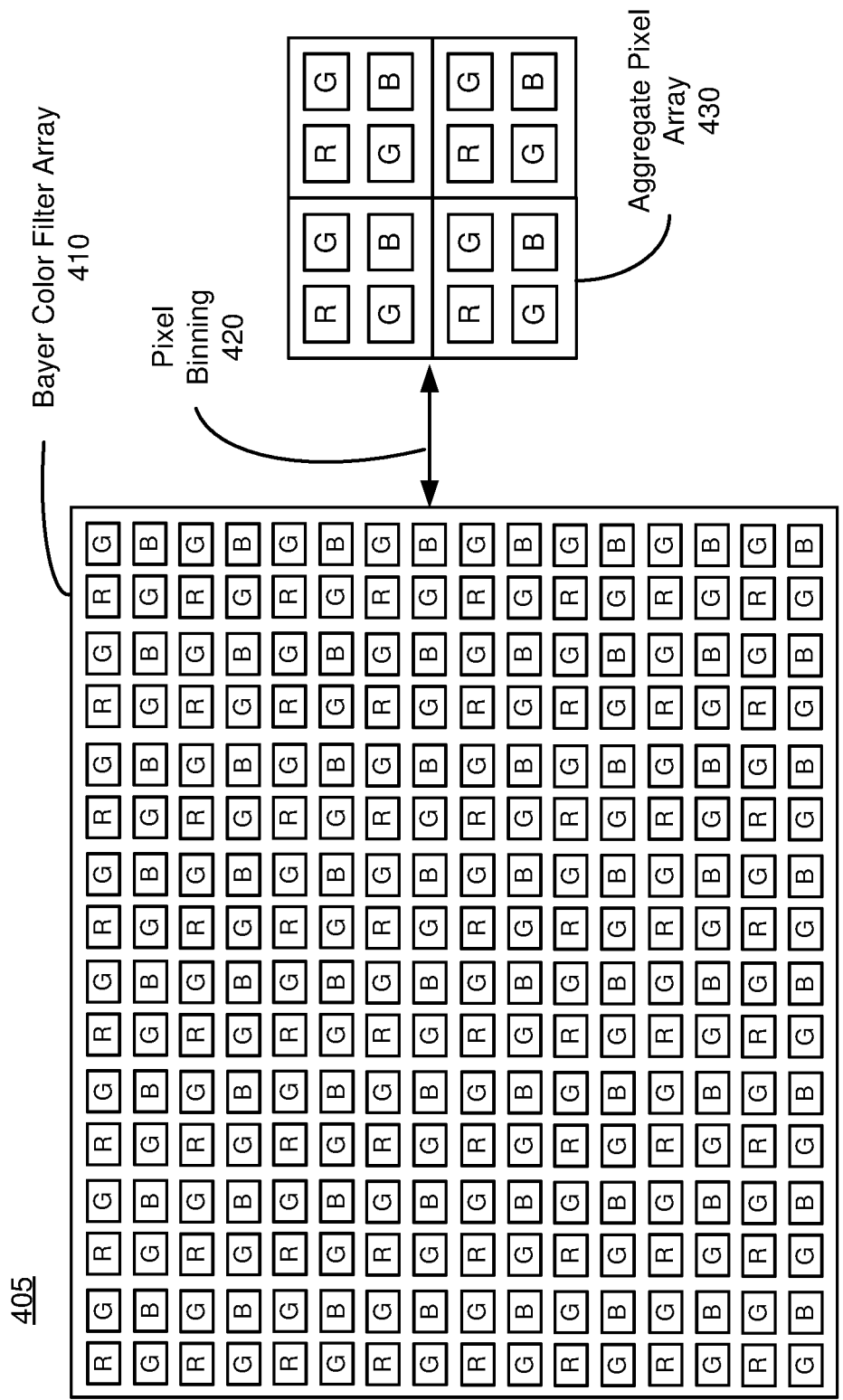
FIG. 4B illustrates another example light sensor, in accordance with one or more embodiments.

FIG. 4B illustrates another example light sensor 405, in accordance with one or more embodiments. The example light sensor 405 depicted in FIG. 4B is a portion of a camera sensor. The light sensor 405 detects colors in a captured image. For instance, the light sensor 405 detects color information for the local area. The light sensor 405 may include a Bayer color filter array 410. The Bayer color filter array comprises a plurality of red, green, and blue color filters arranged in alternating rows of red-green and green-blue as can be seen in FIG. 4B. The Bayer color filter array 410 may comprise more color filters than what is shown in FIG. 4B. The individual red, green, and blue color filters of the Bayer color filter array 410 are binned 420 to form one or more aggregate pixel arrays. The pixel binning 420 allows for the color information collected by several adjacent color filters to be combined. Pixel binning 420 may reduce power consumption and improve the signal-to-noise ratio and frame rate of the light sensor 405. For example, in FIG. 4B, the light sensor 405 is binned to form a 4×4 aggregate pixel array 430. In some embodiments, the pixels from the light sensor 405 are binned into other various sized aggregate pixel arrays. For example, a M×N Bayer color filter array 410 may be binned to a Y×Z low resolution pixel array. For example, a 5 Megapixel (2560×1920) sensor can be binned to 40×30 low resolution pixel array. The larger the aggregate pixel array the better spatial resolution provided in the signal. The color information detected by the light sensor 405 by the aggregate pixel array(s) 430 may be provided to the display controller for use during the environmental matching estimation of the local area.

Process for Customizing Augmented Reality Content

Figure 5:
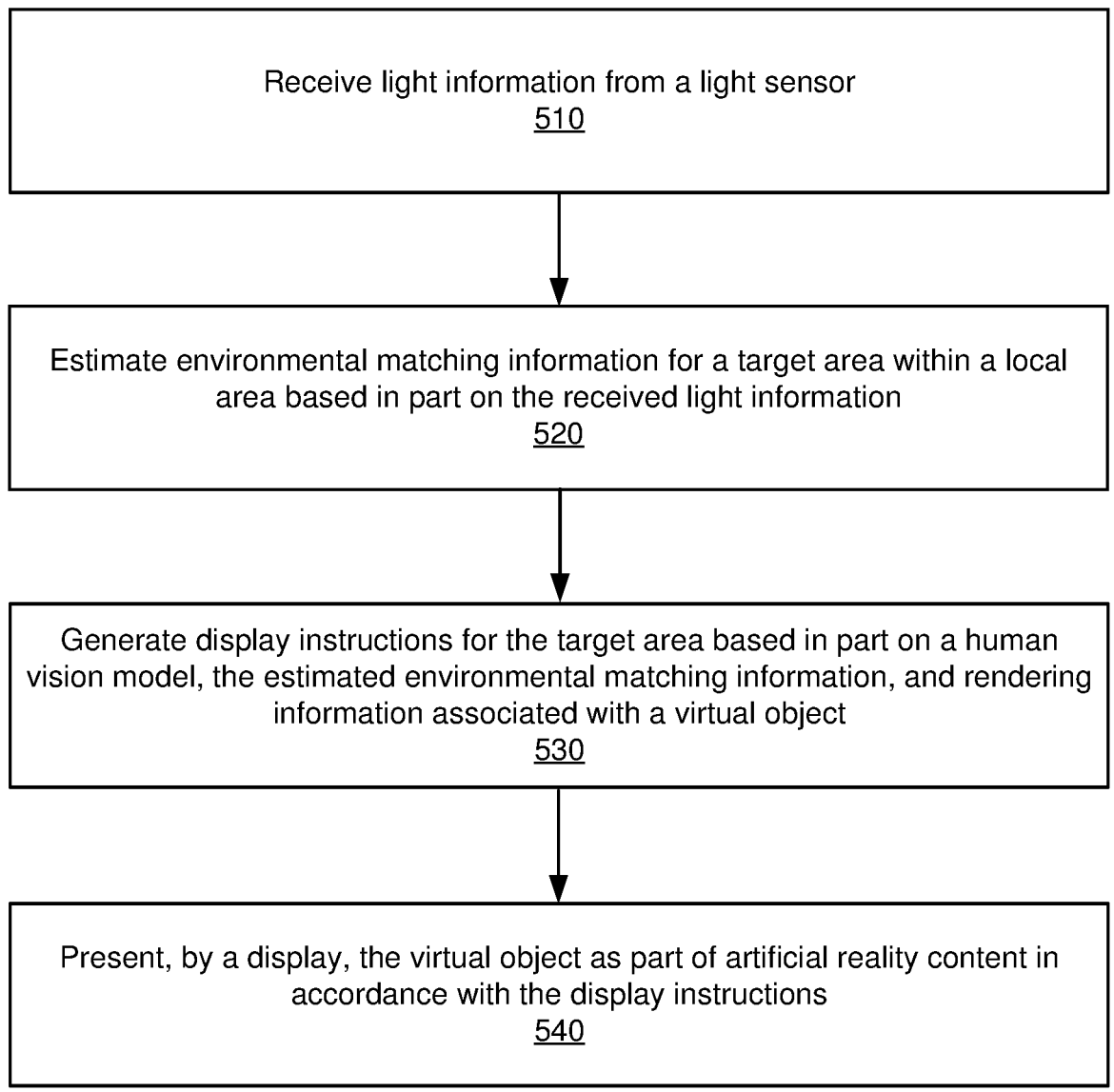
FIG. 5 is a flowchart illustrating a method for customizing a display for presenting AR content, in accordance with one or more embodiments.

FIG. 5 is a flowchart illustrating a method for customizing a display for presenting AR content 500, in accordance with one or more embodiments. The process shown in FIG. 5 may be performed by components of a display assembly (e.g., the display assembly 200). Other entities may perform some or all of the steps in FIG. 5 in other embodiments. Embodiments may include different and/or additional steps, or perform the steps in different orders.

The display assembly receives 510 light information from a light sensor. The light sensor may be integrated into the same electronic device as the display assembly. In some embodiments, the display assembly receives light information from an imaging device. The light information at least describes light values for a plurality of different color channels. For instance, the light values may include a hue value, a saturation value, a color temperature value, some other type of light value that describes the color and/or brightness of a local area surrounding the electronic device.

The display assembly estimates 520 environmental matching information (e.g., color temperature and brightness) for one or more regions within the local area based in part on the received light information. In one embodiment, the estimated environmental matching information may include absolute light values (e.g., a luminance value and a chromaticity value) for the one or more regions within the local area. The estimated environmental matching information for locations within the local area may be used to generate and/or update an environmental matching model. One set of locations the display assembly estimates environmental matching information for is a target area. The target area is one region for placement of a virtual object. In one embodiment, the display assembly may determine where the target area is located based on information provided by a separate device (e.g., a mobile device). The display assembly determines the environmental matching information for the target area based on the environment matching model. Another set of locations the display assembly estimates environmental information for is a portion of the local area. The portion of the local area is a set of locations surrounding the periphery of the target area. The portion of the local area includes the virtual object and real-world objects. The display assembly determines the environmental matching information for the portion of the local area based on the environmental matching model.

In one embodiment, the estimated environmental matching information of the environmental matching model at least includes an estimated color temperature and an estimated brightness for each location. In some embodiments, the estimated environmental matching information may include other color and/or brightness information for each location such as hue, saturation, color temperature, or some other color information that describes the color and/or brightness of the location.

The display assembly generates 530 display instructions for the target area based in part on a human vision model, the estimated environmental matching information, and rendering information associated with a virtual object. The display instructions provide information to a display element related to any color adjustments and/or brightness adjustments needed to display one or more virtual objects in a manner such that the virtual objects are environmentally matched with the portion of the local area (i.e., the color and/or brightness of the virtual objects blend with the portion of the local area). In one embodiment, the display instructions may include one or more pixel value adjustments for the target area.

In some embodiments, the current display instructions may be compared with the estimated environmental matching information. The display instructions may be updated dynamically. For example, a color value included in the current display instructions may be compared with a color value included in the estimated environmental matching information. In response to a difference between the two color values being greater than a predefined threshold value, the display instructions may be updated. In some embodiments, the display instructions are updated if the estimated environmental matching information (e.g., a white point value) has increased or decreased by a predefined threshold value. In some embodiments, the display instructions are updated when the target area for placement of a virtual object is updated. For example, the user of the display assembly may travel to a different local area The display assembly presents 540, by a display, the virtual object as part of AR content in accordance with the display instructions. The AR content may be displayed by one or more display elements of a headset device or another electronic device.

Artificial Reality System Environment

Figure 6:
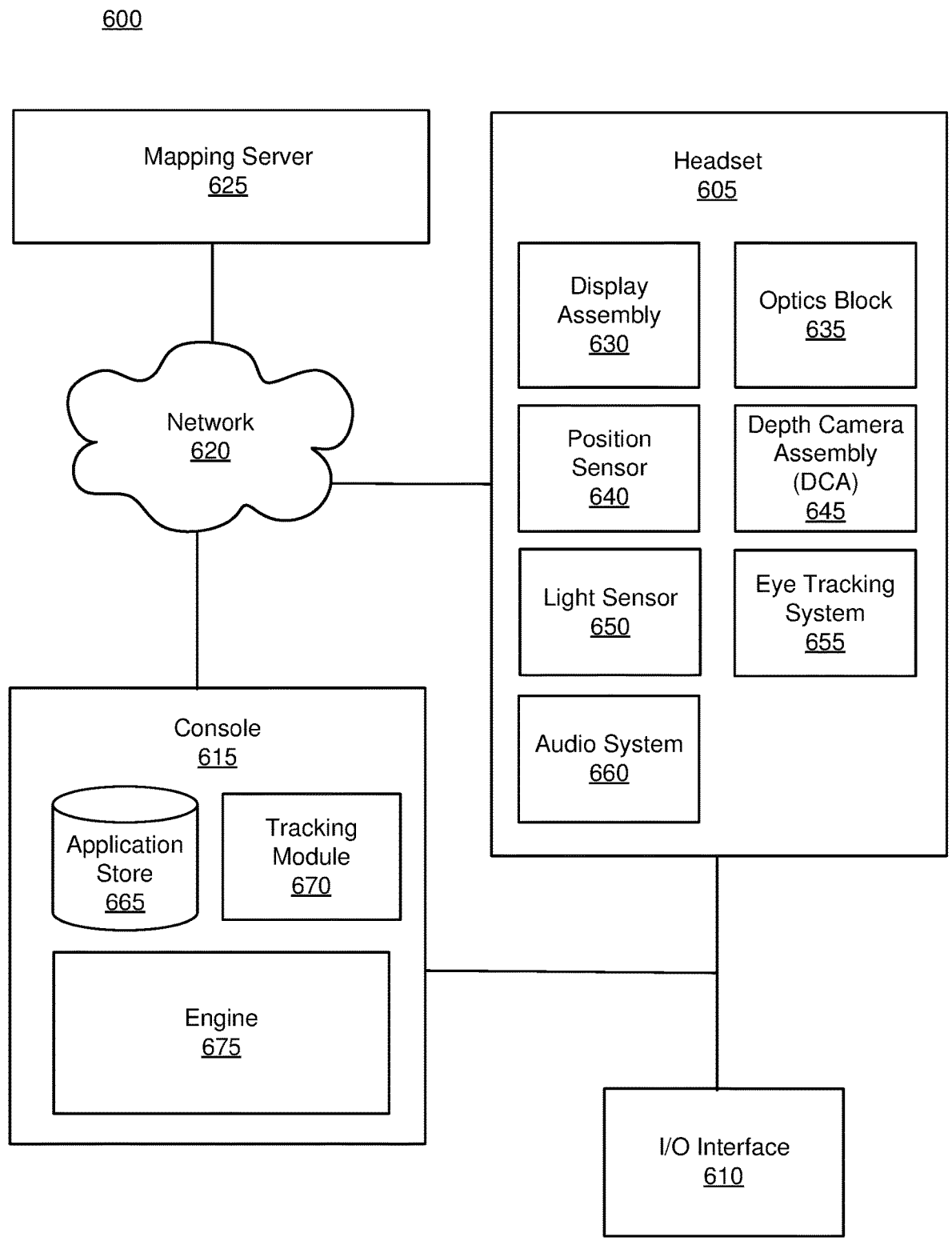
FIG. 6 is a system that includes a headset, in accordance with one or more embodiments.

FIG. 6 is a system 600 that includes a headset 605, in accordance with one or more embodiments. In some embodiments, the headset 605 may be the headset 100 of FIG. 1A or the headset 105 of FIG. 1B. The system 600 may operate in an artificial reality environment (e.g., a virtual reality environment, an augmented reality environment, a mixed reality environment, or some combination thereof). The system 600 shown by FIG. 6 includes the headset 605, an input/output (I/O) interface 610 that is coupled to a console 615, the network 620, and the mapping server 625. While FIG. 6 shows an example system 600 including one headset 605 and one I/O interface 610, in other embodiments any number of these components may be included in the system 600. For example, there may be multiple headsets each having an associated I/O interface 610, with each headset and I/O interface 610 communicating with the console 615. In alternative configurations, different and/or additional components may be included in the system 600. Additionally, functionality described in conjunction with one or more of the components shown in FIG. 6 may be distributed among the components in a different manner than described in conjunction with FIG. 6 in some embodiments. For example, some or all of the functionality of the console 615 may be provided by the headset 605.

The headset 605 includes the display assembly 630, an optics block 635, one or more position sensors 640, a DCA 645, one or more light sensors 650, an eye tracking system 655, and an audio system 660. Some embodiments of headset 605 have different components than those described in conjunction with FIG. 6. Additionally, the functionality provided by various components described in conjunction with FIG. 6 may be differently distributed among the components of the headset 605 in other embodiments, or be captured in separate assemblies remote from the headset 605.

The display assembly 630 displays AR content to the user in accordance with display instructions generated by a display controller. The display assembly 630 displays the AR content using one or more display elements (e.g., the display element 120 or the display element 210). A display element may be, e.g., an electronic display. In various embodiments, the display assembly 630 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 635.

The optics block 635 may magnify image light received from the electronic display, corrects optical errors associated with the image light, and presents the corrected image light to one or both eyeboxes of the headset 605. In various embodiments, the optics block 635 includes one or more optical elements. Example optical elements included in the optics block 635 include: an aperture, a Fresnel lens, a convex lens, a concave lens, a filter, a reflecting surface, or any other suitable optical element that affects image light. Moreover, the optics block 635 may include combinations of different optical elements. In some embodiments, one or more of the optical elements in the optics block 635 may have one or more coatings, such as partially reflective or anti-reflective coatings.

Magnification and focusing of the image light by the optics block 635 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases all, of the user's field of view. Additionally, in some embodiments, the amount of magnification may be adjusted by adding or removing optical elements.

In some embodiments, the optics block 635 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 635 corrects the distortion when it receives image light from the electronic display generated based on the content.

The position sensor 640 is an electronic device that generates data indicating a position of the headset 605. The position sensor 640 generates one or more measurement signals in response to motion of the headset 605. The position sensor 190 is an embodiment of the position sensor 640. Examples of a position sensor 640 include: one or more IMUS, one or more accelerometers, one or more gyroscopes, one or more magnetometers, another suitable type of sensor that detects motion, or some combination thereof. The position sensor 640 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 605 from the sampled data. For example, the IMU integrates the measurement signals received from the accelerometers over time to estimate a velocity vector and integrates the velocity vector over time to determine an estimated position of a reference point on the headset 605. The reference point is a point that may be used to describe the position of the headset 605. While the reference point may generally be defined as a point in space, however, in practice the reference point is defined as a point within the headset 605.

The DCA 645 generates depth information for the local area. In some embodiments, the DCA 645 provides light information about the local area to the display assembly 630. The DCA includes one or more imaging devices and a DCA controller. The DCA 645 may also include an illuminator. Operation and structure of the DCA 645 is described above with regard to FIG. 1A.

The light sensor 650 determines light information about the local area. The light sensor 650 may include an ambient light sensor, a color sensor, a photodetector, another type of photoelectric device, an active infrared sensor, a passive infrared sensor, a camera (e.g., an imaging device of the DCA 645, a camera on an eye tracking system 655, etc.), another suitable type of sensor that detects light, or some combination thereof. The light information may include light values for a plurality of different color channels. The light values may include chromaticity measurements, luminance measurements, color temperature values, some other light value that quantifies the color and/or brightness of the local area, or some combination thereof. The light sensor 650 may include: an ambient light sensor, a color sensor, a photodetector (e.g., a photodiode, phototransistor, photoresistor, etc.), a photoelectric device, an active infrared sensor, a passive infrared sensor, another suitable type of sensor that detects light, or some combination thereof. The light sensor 650 provides the light information to the display assembly 630.

The eye tracking system 655 determines eye tracking information associated with an eye of the user wearing the headset 605. The eye tracking information determined by the eye tracking system 655 may include, e.g., gaze direction. The gaze direction may be used to determine where a user is looking. The eye tracking system 655 may utilize one or more cameras to track the eye(s) of the user.

The audio system 660 provides audio content to a user of the headset 605. The audio system 660 may comprise one or acoustic sensors, one or more transducers, and an audio controller. The audio system 660 may provide spatialized audio content to the user. In some embodiments, the audio system 660 may request acoustic parameters from the mapping server 625 over the network 620. The acoustic parameters describe one or more acoustic properties (e.g., room impulse response, a reverberation time, a reverberation level, etc.) of the local area. The audio system 660 may provide information describing at least a portion of the local area from e.g., the DCA 645 and/or location information for the headset 605 from the position sensor 640. The audio system 660 may generate one or more sound filters using one or more of the acoustic parameters received from the mapping server 625, and use the sound filters to provide audio content to the user.

The I/O interface 610 is a device that allows a user to send action requests and receive responses from the console 615. An action request is a request to perform a particular action. For example, an action request may be selecting a presented color (i.e., a presented virtual color) to a reference color during a color calibration process. In another example, an action request may be an instruction to start or end capture of image or video data, or an instruction to perform a particular action within an application. The I/O interface 610 may include one or more input devices. Example input devices include: a keyboard, a mouse, a game controller, or any other suitable device for receiving action requests and communicating the action requests to the console 615. An action request received by the I/O interface 610 is communicated to the console 615, which performs an action corresponding to the action request. In some embodiments, the I/O interface 610 includes an IMU that captures calibration data indicating an estimated position of the I/O interface 610 relative to an initial position of the I/O interface 610. In some embodiments, the I/O interface 610 may provide haptic feedback to the user in accordance with instructions received from the console 615. For example, haptic feedback is provided when an action request is received, or the console 615 communicates instructions to the I/O interface 610 causing the I/O interface 610 to generate haptic feedback when the console 615 performs an action.

The console 615 provides content to the headset 605 for processing in accordance with information received from one or more of: the DCA 645, the headset 605, and the I/O interface 610. In the example shown in FIG. 6, the console 615 includes an application store 665, a tracking module 670, and an engine 675. Some embodiments of the console 615 have different modules or components than those described in conjunction with FIG. 6. Similarly, the functions further described below may be distributed among components of the console 615 in a different manner than described in conjunction with FIG. 6. In some embodiments, the functionality discussed herein with respect to the console 615 may be implemented in the headset 605, or a remote system.

The application store 665 stores one or more applications for execution by the console 615. An application is a group of instructions, that when executed by a processor, generates content for presentation to the user. The content may include one or more virtual objects and/or one or more target locations. Content generated by an application may be in response to inputs received from the user via movement of the headset 605 or the I/O interface 610. Examples of applications include: gaming applications, conferencing applications, video playback applications, or other suitable applications.

The tracking module 670 tracks movements of the headset 605 or of the I/O interface 610 using information from the DCA 645, the one or more position sensors 640, or some combination thereof. For example, the tracking module 670 determines a position of a reference point of the headset 605 in a mapping of a local area based on information from the headset 605. The tracking module 670 may also determine positions of an object or virtual object. Additionally, in some embodiments, the tracking module 670 may use portions of data indicating a position of the headset 605 from the position sensor 640 as well as representations of the local area from the DCA 645 to predict a future location of the headset 605. The tracking module 670 provides the estimated or predicted future position of the headset 605 or the I/O interface 610 to the engine 675.

The engine 675 executes applications and receives position information, acceleration information, velocity information, predicted future positions, or some combination thereof, of the headset 605 from the tracking module 670. Based on the received information, the engine 675 determines content to provide to the headset 605 for presentation to the user. For example, if the received information indicates that the user has looked to the left, the engine 675 generates content for the headset 605 that mirrors the user's movement in a virtual local area or in a local area augmenting the local area with additional content. Additionally, the engine 675 performs an action within an application executing on the console 615 in response to an action request received from the I/O interface 610 and provides feedback to the user that the action was performed. The provided feedback may be visual or audible feedback via the headset 605 or haptic feedback via the I/O interface 610.

The network 620 couples the headset 605 and/or the console 615 to the mapping server 625. The network 620 may include any combination of local area and/or wide area networks using both wireless and/or wired communication systems. For example, the network 620 may include the Internet, as well as mobile telephone networks. In one embodiment, the network 620 uses standard communications technologies and/or protocols. Hence, the network 620 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 620 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 620 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 625 may include a database that stores a virtual model describing a plurality of spaces, wherein one location in the virtual model corresponds to a current configuration of a local area of the headset 605. The mapping server 625 receives, from the headset 605 via the network 620, information describing at least a portion of the local area and/or location information for the local area. The mapping server 625 determines, based on the received information and/or location information, a location in the virtual model that is associated with the local area of the headset 605. The mapping server 625 determines (e.g., retrieves) one or more acoustic parameters associated with the local area, based in part on the determined location in the virtual model and any acoustic parameters associated with the determined location. The mapping server 625 may transmit the location of the local area and any values of acoustic parameters associated with the local area to the headset 605.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A display assembly comprising:
   a display controller configured to:
      estimate environmental matching information for a target area within a local area based in part on light information received from a light sensor, wherein the target area is a region for placement of a virtual object, and the light information at least describes light values for a plurality of different color channels, and
      generate display instructions for the target area based in part on a human vision model, the estimated environmental matching information, and rendering information associated with the virtual object; and
   a display configured to present the virtual object as part of artificial reality content in accordance with the display instructions, the artificial reality content including the virtual object in the target area and a portion of the local area surrounding the target area, wherein color and brightness of the virtual object blends with color and brightness of the portion of the local area surrounding the target area.

2. The display assembly of claim 1, wherein the display instructions include one or more pixel value adjustments for the target area, the pixel value adjustments controlling the color and the brightness of the virtual object.

3. The display assembly of claim 1, wherein the light information includes a hue value and a saturation value for the target area, and the display controller is further configured to estimate the environmental matching information for the target area within the local area based in part on the hue value and the saturation value.

4. The display assembly of claim 1, wherein the light information includes an infrared measurement value for the target area, and the display controller is further configured to estimate environmental matching information for the target area within the local area based in part on the infrared measurement value.

5. The display assembly of claim 1, wherein the display controller is further configured to:
   update the display instructions dynamically for the target area based in part on the light information received from the light sensor changing by a predefined threshold value.

6. The display assembly of claim 1, wherein the human vision model is standardized measurements of color that describe how to present a measured color to a user.

7. The display assembly of claim 1, wherein the rendering information is a predetermined color and a predetermined brightness of the virtual object.

8. The display assembly of claim 1, wherein the light information is received from at least one of: a camera of a depth camera assembly and a camera of an eye tracking system.

9. A method comprising:
   receiving light information from a light sensor, the light information at least describes light values for a plurality of different color channels;
   estimating environmental matching information for a target area within a local area based in part on the received light information, wherein the target area is a region for placement of a virtual object;
   generating display instructions for the target area based in part on a human vision model, the estimated environmental matching information, and rendering information associated with the virtual object; and
   presenting, by a display, the virtual object as part of artificial reality content in accordance with the display instructions, the artificial reality content including the virtual object in the target area and a portion of the local area surrounding the target area, wherein color and brightness of the virtual object blends with color and brightness of the portion of the local area surrounding the target area.

10. The method of claim 9, wherein the display instructions include one or more pixel value adjustments for the target area, the pixel value adjustments controlling color and brightness of the virtual object.

11. The method of claim 9, wherein the light information includes a hue value and a saturation value for the target area, the method further comprising:
   estimating environmental matching information for the target area within the local area based in part on the hue value and the saturation value.

12. The method of claim 9, wherein the light information includes an infrared measurement value for the target area, the method further comprising:
   estimating environmental matching information for the target area within the local area based in part on the infrared measurement value.

13. The method of claim 9, further comprising:
updating the display instructions dynamically for the target area based in part on the light information received from the light sensor changing by a predefined threshold value.

14. The method of claim 9, wherein the human vision model is standardized measurements of color that describe how to present a measured color to a user.

15. The method of claim 9, wherein the rendering information is a predetermined color and a predetermined brightness of the virtual object.

16. The method of claim 9, wherein the light information is received from at least one of: a camera of a depth camera assembly and a camera of an eye tracking system.

17. A non-transitory computer-readable storage medium storing instructions that, when executed by one or more processors, cause the one or more processors to perform operations comprising:
receiving light information from a light sensor, the light information at least describes light values for a plurality of different color channels;
estimating environmental matching information for a target area within a local area based in part on the received light information, wherein the target area is a region for placement of a virtual object;
generating display instructions for the target area based in part on a human vision model, the estimated environmental matching information, and rendering information associated with the virtual object; and
presenting, via a display, the virtual object as part of artificial reality content in accordance with the display instructions, the artificial reality content including the virtual object in the target area and a portion of the local area surrounding the target area, wherein color and brightness of the virtual object blends with color and brightness of the portion of the local area surrounding the target area.

18. The computer-readable medium of claim 17, wherein the display instructions include one or more pixel value adjustments for the target area, the pixel value adjustments controlling color and brightness of the virtual object.

19. The computer-readable medium of claim 17, the instructions further cause the one or more processors to perform operation further comprising:
receiving light information from the light sensor, the light information includes an infrared measurement value; and
estimating environmental matching information for the target area within the local area based in part on the infrared measurement value.

20. The computer-readable medium of claim 17, the instructions further cause the one or more processors to perform operations further comprising:
updating the display instructions dynamically for the target area based in part on the light information received from the light sensor changing by a predefined threshold value.

\* \* \* \* \*